(12) United States Patent
Gough et al.

(10) Patent No.: US 11,248,898 B2
(45) Date of Patent: Feb. 15, 2022

(54) ROLL FED MATERIAL MEASUREMENT DEVICE

(71) Applicant: R.J. REYNOLDS TOBACCO PRODUCTS, Winston-Salem, NC (US)

(72) Inventors: Van L. Gough, Kernersville, NC (US); Edmond S. Smith, Rural Hall, NC (US)

(73) Assignee: RJ Reynolds Tobacco Company, Winston-Salem, NC (US)

( * ) Notice: Subject to any disclaimer, the term of this patent is extended or adjusted under 35 U.S.C. 154(b) by 356 days.

(21) Appl. No.: 16/549,122

(22) Filed: Aug. 23, 2019

(65) Prior Publication Data

US 2021/0055094 A1 Feb. 25, 2021

(51) Int. Cl.
| | | |
|---|---|---|
| *G01B 5/28* | (2006.01) | |
| *A24C 5/34* | (2006.01) | |
| *A24C 5/58* | (2006.01) | |
| *G01B 3/34* | (2006.01) | |

(52) U.S. Cl.
CPC ............... *G01B 5/28* (2013.01); *A24C 5/34* (2013.01); *A24C 5/58* (2013.01); *G01B 3/34* (2013.01)

(58) Field of Classification Search
CPC .................................. A24C 5/34; G01B 3/34
USPC ........................................................ 33/533
See application file for complete search history.

(56) References Cited

U.S. PATENT DOCUMENTS

| | | |
|---|---|---|
| 4,911,184 A | 3/1990 | Case et al. |
| 5,360,023 A | 11/1994 | Blakley et al. |
| 5,448,505 A | 9/1995 | Novak |
| 5,469,871 A | 11/1995 | Barnes et al. |
| 6,658,947 B1 | 12/2003 | Sendzimir et al. |
| 7,197,834 B2 * | 4/2007 | Heimer ............... G01B 21/042 33/502 |
| 7,245,199 B1 * | 7/2007 | Reilly .................. B23D 59/002 33/628 |
| 7,345,773 B2 | 3/2008 | Yano |
| 7,503,330 B2 | 3/2009 | Borschke et al. |
| 7,617,611 B2 * | 11/2009 | Bengi ...................... G01B 3/10 33/561.1 |
| 7,647,932 B2 | 1/2010 | Cantrell et al. |
| 7,753,056 B2 | 7/2010 | Borschke et al. |
| 8,574,141 B2 | 11/2013 | Barnes et al. |

(Continued)

FOREIGN PATENT DOCUMENTS

CN 103411577 A 11/2013

*Primary Examiner* — George B Bennett
(74) *Attorney, Agent, or Firm* — Foley & Lardner LLP

(57) ABSTRACT

A measurement apparatus includes a horizontal plate. The horizontal plate includes a first plate end, a second plate end disposed away from the first plate end in a longitudinal direction, a first plate surface extending between the first plate end and the second plate end, and a second plate surface extending between the first plate end and the second plate end. The second plate surface is disposed away from the first plate surface in a normal direction. A first support member extends from the first plate end longitudinally toward the second plate end and protrudes in a direction normally away from the second plate surface. A second support member extends from the first plate end longitudinally toward the second plate end and protrudes in a direction normally away from the second plate surface. A measurement bar contacts the first support member and the second support member.

20 Claims, 6 Drawing Sheets

(56) References Cited

U.S. PATENT DOCUMENTS

| | | |
|---|---|---|
| 9,247,770 B2 | 2/2016 | Barnes et al. |
| 2010/0186757 A1 | 7/2010 | Crooks et al. |
| 2012/0042885 A1 | 2/2012 | Stone et al. |
| 2012/0067360 A1 | 3/2012 | Conner et al. |
| 2013/0167851 A1 | 7/2013 | Ademe et al. |
| 2020/0333366 A1* | 10/2020 | Li .................... G01N 1/2205 |
| 2021/0231635 A1* | 7/2021 | Ademe .............. B65H 18/103 |

* cited by examiner

ROLL FED MATERIAL MEASUREMENT DEVICE

TECHNICAL FIELD

The present invention relates to measurement devices.

BACKGROUND

Popular smoking articles, such as cigarettes, have a substantially cylindrical rod shaped structure and include a charge, roll, or column of smokable material, such as shredded tobacco (e.g., in cut filler form), surrounded by a paper wrapper, thereby forming a so called "smokable rod", "tobacco rod" or "cigarette rod." Normally, a cigarette has a cylindrical filter element aligned in an end to end relationship with the tobacco rod. Preferably, a filter element comprises plasticized cellulose acetate tow circumscribed by a paper material known as "plug wrap." Preferably, the filter element is attached to one end of the tobacco rod using a circumscribing wrapping material known as "tipping paper." It also has become desirable to perforate the tipping material and plug wrap, in order to provide dilution of drawn mainstream smoke with ambient air. Descriptions of cigarettes and the various components thereof are set forth in Tobacco Production, Chemistry and Technology, Davis et al. (Eds.) (1999), U.S. Pat. No. 7,503,330 to Borschke et al., U.S. Pat. No. 5,360,023 to Blakley et al., U.S. Pat. No. 4,911,184 to Case et al., U.S. patent application Ser. No. 13/338,647 by Ademe et al., U.S. Pat. No. 9,247,770 to Barnes et al., and U.S. Pat. No. 8,574,141 to Barnes et al., which are incorporated herein by reference. A traditional type of cigarette is employed by a user by lighting one end thereof and burning the tobacco rod. The user then receives mainstream smoke into his/her mouth by drawing on the opposite end (e.g., the filter end or mouth end) of the cigarette. Through the years, efforts have been made to improve upon the components, construction, and performance of smoking articles. See, for example, the background art discussed in U.S. Pat. No. 7,753,056 to Borschke et al.

As an alternative to burning tobacco, other types of smoking articles have been developed that employ carbonaceous fuel elements to heat, but not burn substrates containing an aerosol former that is volatilized to form an inhalable aerosol in response to heat generated by the carbonaceous fuel element. These "heat-not-burn" smoking articles have been commercially marketed under the brand names "Premier," "Eclipse" and "Revo" by R. J. Reynolds Tobacco Company. See, for example, those types of cigarettes described in Chemical and Biological Studies on New Cigarette Prototypes that Heat Instead of Burn Tobacco, R. J. Reynolds Tobacco Company Monograph (1988) and Inhalation Toxicology, 12:5, p. 1 58 (2000). Additionally, a similar type of cigarette has been marketed in Japan by Japan Tobacco Inc. under the brand name "Steam Hot One."

These heat-not-burn smoking articles, whether heated through a combustible heat source, electrical heating by a device, or other means, generally, like traditional combustible cigarettes, comprise a plurality of segments, such as one or more aerosol generating segments and/or one or more filter segments aligned in an end-to-end alignment. Various manners and methods for assembling smoking articles that possess a plurality of sequentially arranged segmented components have been proposed. See, for example, the various types of assembly techniques and methodologies set forth in U.S. Pat. No. 5,469,871 to Barnes et al. and U.S. Pat. No. 7,647,932 to Cantrell et al.; and U.S. Pat. App. Pub. Nos. 2010/0186757 to Crooks et al.; 2012/0042885 to Stone et al., and 2012/0067360 to Conner et al.; each of which is incorporated by reference herein in its entirety.

Among the techniques used to assemble segmented smoking articles, including the attachment of filter segments to other rod components is the use of circumscribing wrapping material, such as paper wrapping. One such example of this is so called tipping paper. These wrapping materials are generally supplied as material rolls, or "bobbins", that are then roll fed to equipment used in automated high speed manufacturing processes. When using roll fed material in this manner, it is important to ensure the position and alignment of the wrapping material is as intended. This is especially important with respect to some smoking articles that utilize a tipping paper with a reduced width compared to conventional tipping papers. As a result, the position of the tipping paper is important for formation of a uniform smoking article (e.g., a quality or user-preferred smoking article) as the overlap between the filter element and tipping paper is narrower. If the tipping paper is telescoped, rounded, or curved (e.g., not flat), use of the rounded tipping paper in the formation of the combustible smoking article increases the likelihood and incidence of manufacturing issues such as the filter element falling off of the tipping paper. Accordingly, it would be desirable to provide a device that can measure (e.g., quantify) the flatness and/or roundness of wrapping materials, such as tipping paper (e.g., before the tipping paper is used to attach the filter element to one end of the tobacco rod).

SUMMARY

Various example embodiments relate to a measurement apparatus. The measurement apparatus includes a horizontal plate. The horizontal plate includes a first plate end, a second plate end disposed away from the first plate end in a longitudinal direction, a first plate surface extending between the first plate end and the second plate end, and a second plate surface extending between the first plate end and the second plate end. The second plate surface is disposed away from the first plate surface in a normal direction. The normal direction is perpendicular to the longitudinal direction. A first support member extends from the first plate end longitudinally toward the second plate end. The first support member protrudes from the first plate surface away from the second plate surface in the normal direction. A second support member extends from the first plate end longitudinally toward the second plate end. The second support member protrudes from the first plate surface away from the second plate surface in the normal direction. The second support member is disposed away from the first support member in a lateral direction. The lateral direction is perpendicular to the normal direction, and the lateral direction is perpendicular to the longitudinal direction. A measurement bar contacts the first support member and the second support member. An indicator is coupled to the measurement bar. The indicator is configured to measure a surface of a test material. The test material is positioned on the first plate surface between the first support member and the second support member.

According to a second set of embodiments, a measurement apparatus is described. The measurement apparatus includes a vertical plate. The vertical plate includes a first plate end, a second plate end disposed away from the first plate end in a normal direction, a first plate surface extending between the first plate end and the second plate end, and a second plate surface extending between the first plate end and the second plate end. The second plate surface is disposed away from the first plate surface in a longitudinal direction. The normal direction is perpendicular to the longitudinal direction. A cylinder extends from the first plate surface away from the second plate surface. The cylinder is configured to receive a test material. The cylinder protrudes through a central opening in the test material when the test material is positioned adjacent the first plate surface. An indicator is coupled to the first plate surface and includes a sensor configured to contact a surface of the test material.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings. Exemplary embodiments of the present application will now be described, way of example only, with reference to the accompanying drawings, which are not necessarily drawn to scale, and wherein:

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will be thorough and complete, will fully convey the scope of the disclosure to those skilled in the art, and will satisfy applicable legal requirements. Like numbers refer to like elements throughout. As used in this specification and the claims, the singular forms "a," "an," and "the" include plural referents unless the context clearly dictates otherwise.

DETAILED DESCRIPTION

Embodiments described herein generally relate to a measurement system (e.g., measurement device, measurement apparatus, etc.) for measuring and quantifying properties of a roll fed material. As used herein, the term "roll fed" refers to a roll or one of two or more rolls by which material is drawn or fed into a machine. One embodiment described herein relates to a roll fed material measurement apparatus with a pair of measurement portions. In other embodiments, the roll fed material measurement apparatus includes a binary (e.g., go or no-go) measurement portion. The roll fed material measurement apparatus may be used to measure concentricity, flatness, total runout, parallelism, roundness, and other parameters of a given material.

The roll fed material measurement apparatus may implement one or more indicators (e.g., sensors, data collection devices, etc.) that collect data on the various parameters of the roll fed material in order to conduct statistical analysis and determine variables such as process capability, lot acceptability, and standard deviation of a set of roll fed materials. In some embodiments, the roll fed material measurement apparatus is used to measure and quantify properties of tipping paper in order to determine behavior when the tipping paper circumscribed around the filter element to attached the filter element to one end of the tobacco rod. While the roll fed material measurement apparatus is described as measuring and quantifying the properties of wrapping materials, such as tipping paper, for smoking articles, the roll fed material measurement apparatus may be used to measure other roll fed materials to identify and quantify the roll fed material properties of those materials. For example, the roll fed material measurement apparatus may be used to measure the material properties of, inserts, inner-frames, and film.

Figure 1:
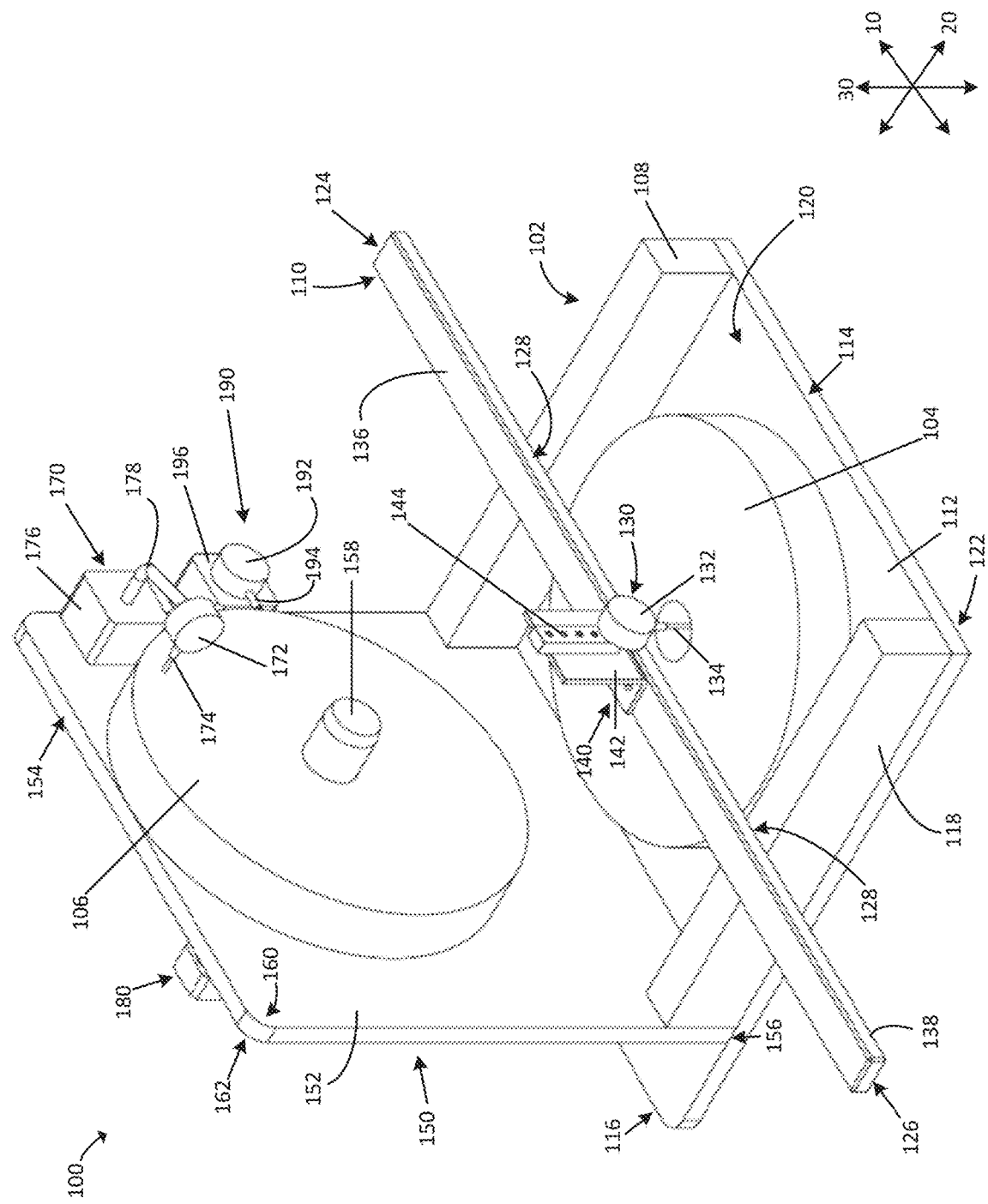
FIG. 1 is a front perspective view of a roll fed material measurement apparatus, according to an example embodiment.

Referring to FIG. 1, a roll fed material measurement apparatus 100 with a first measurement portion 102 and a second measurement portion 150 is shown, according to an example embodiment. The first measurement portion 102 is configured to receive and measure a first test material 104 and the second measurement portion 150 is configured to receive and measure a second test material 106. The first test material 104 and the second test material 106 may be the same roll fed material. In some embodiments, the first test material 104 and/or the second test material 106 is a tipping bobbin. The roll fed material measurement apparatus 100 may be configured such that the first measurement portion 102 may measure the first test material 104 in parallel with the second measurement portion 150 measuring the second test material 106. The roll fed material measurement apparatus 100 has a height along a normal direction 30, a width along a lateral direction 10, and a length along a longitudinal direction 20. The lateral direction 10 is substantially perpendicular to the longitudinal direction 20 and substantially parallel to the normal direction 30. The longitudinal direction 20 is substantially parallel to the normal direction 30.

The first measurement portion 102 includes a horizontal plate 112, a first support member 108 (e.g., first ground member), a second support member 118 (e.g., second ground member), measurement bar 110, and a first measurement indicator 130. Generally, the first measurement portion 102 is configured to measure the flatness and related properties of the first test material 104. The measurement bar 110 moves adjacent the surface of the first test material 104 causing the first measurement indicator 130 move along and measure the surface of the first test material 104. In some embodiments, and as shown in FIGS. 1-4, the first measurement indicator 130 of the first measurement portion 102 captures data by physically contacting the first test material 104. In other embodiments, the first measurement indicator 130 of the first measurement portion 102 does not contact the first test material 104 as it captures data.

The horizontal plate 112 includes a first plate end 114 and a second plate end 116 disposed longitudinally away from the first plate end 114. In other words, the horizontal plate 112 is orientated horizontally along the longitudinal direction 20 and lateral direction 10. A first plate surface 120 (e.g., top surface) extends from the first plate end 114 toward the second plate end 116 and is configured to receive the first test material 104. A second plate surface 122 (e.g., bottom surface) is displaced in the normal direction 30 away from, and substantially parallel to, the first plate surface 120. The second plate surface 122 extends from the first plate end 114 toward the second plate end 116. In some embodiments, a cylinder or other protruding or securing member extends from the first plate surface 120 to keep the first test material 104 positioned within the test area. In other embodiments, the first support member 108 and the second support member 118 keep the first test material 104 positioned within the test area. In some embodiments, the horizontal plate 112 is a datum plate.

The first support member 108 and the second support member 118 each extend from the first plate surface 120 in the normal direction 30 away from the second plate surface 122. The second support member 118 is displaced from the first support member 108 in the lateral direction 10 and the second support member 118 is substantially parallel to the first support member 108. Each of the first support member 108 and the second support member 118 are configured to receive a portion of the measurement bar 110 and allow movement of the measurement bar 110 therealong. In some embodiments, the first support member 108 and the second support member 118 are identical heights such that when the when the measurement bar 110 rests upon the first support member 108 and the second support member 118 it is substantially flat (e.g., 180-degrees along the surface of the measurement bar 110).

The measurement bar 110 includes the first measurement indicator 130 between the first bar end 124 and the second bar end 126. The first bar end 124 is disposed away from the second bar end 126 in the lateral direction 10. A first bar surface 136 (e.g., top surface) extends from the first bar end 124 toward the second bar end 126. A second bar surface 138 (e.g., bottom surface) is displaced in the normal direction 30 away from, and substantially parallel to, the first bar surface 136. The second bar surface 138 extends from the first bar end 124 toward the second bar end 126 and is configured to be adjacent to the first test material 104. The second bar surface 138 includes contact portions 128 configured to contact the top surface of the first support member 108 and the second support member 118. In some embodiments, the measurement bar 110 moves along the first support member 108 and the second support member 118 in the lateral direction 10. In those embodiments, the contact portions 128 change as the measurement bar moves along the lateral direction 10. In some embodiments, the measurement bar 110 moves along the first support member 108 and the second support member 118 in the longitudinal direction 20. In those embodiments, the contact portions 128 are substantially the same as the measurement bar moves along the longitudinal direction 20. In other embodiments, the measurement bar 110 moves along the first support member 108 and the second support member 118 in the lateral direction 10, the longitudinal direction 20, and diagonally between the lateral direction 10 and the longitudinal direction 20.

As shown in FIG. 1, the first measurement indicator 130 is coupled to the first bar surface 136 with an indicator support member 140. In some embodiments, the first measurement indicator 130 is coupled to a substantially central location (e.g., midway between the first bar end 124 and the second bar end 126) of the first bar surface 136. The indicator support member 140 includes a bracket 142 and a mounting member 144 coupled to the bracket 142. The bracket 142 is configured to couple to the first bar surface 136. In some embodiments, the bracket 142 is affixed with a pair of bolts. The mounting member 144 is configured to receive a portion of the first indicator 132 of the first measurement indicator 130. The first indicator 132 includes a sensor 134 that extends in the normal direction 30. In some embodiments, the first indicator 132 is a dial indicator and the sensor 134 is a contact-based wire. In such embodiments, the contact-based wire may include a first wire end and a second wire end such that the sensor captures a distance between the first wire end and the second wire end at a plurality of points along the surface of the test material to identify changes in the height (e.g., flatness) of the surface of the test material. In other embodiments, the sensor 134 comprises an infrared, laser, or other light based measurement device. The sensor 134 may be configured to capture, measure, or quantify one or more properties of the test material, including concentricity, flatness, total runout, parallelism, roundness, and other parameters of the test material.

In practice, a user places the first test material 104 between the first support member 108 and the second support member 118 with the surface of the first test material 104 that is to be tested facing upward and the non-testing surface of the first test material 104 resting on the first plate surface 120. The first measurement indicator 130 is positioned above the test surface of the first test material 104 such that the sensor 134 is in contact with test surface of the first test material 104. In some embodiments, a cable with actuator is operably connected to the first measurement indicator 130 and is configured to be pressed by the user to capture data. The user moves the measurement bar 110 along the surface of the first support member 108 and the second support member 118 to cause the sensor 134 to contact a plurality of points along the test surface of the first test material 104. Data is collected by the sensor 134 as the sensor 134 moves along the test surface of the first test material 104 to quantify the flatness of the test surface of the first test material 104. In some embodiments, the sensor 134 captures a minimum and maximum distance along the test surface of the first test material 104 to determine the variance in the test surface of the first test material 104. In some embodiments, an acceptable variance in the material is 1 mm.

The second measurement portion 150 includes a vertical plate 152, a second measurement indicator 170, a third measurement indicator 190, and a fluid system 180 (e.g. air providing system, pneumatic system, hydraulic system, etc.). Generally, the second measurement portion 150 is configured to measure the roundness and related properties of the second test material 106. The second test material 106 is positioned on a longitudinally protruding cylinder 158 and rotated about the axis of the cylinder 158 such that the second measurement indicator 170 contacts a surface of the second test material 106 and the third measurement indicator 190 contacts a perimeter of the second test material 106. In some embodiments, and as shown in FIG. 1, the second measurement indicator 170 and the third measurement indicator 190 capture data by physically contacting the second test material 106. In other embodiments, the second measurement indicator 170 and the third measurement indicator 190 of the second measurement portion 150 does not contact the second test material 106 as they capture data.

Figure 4:
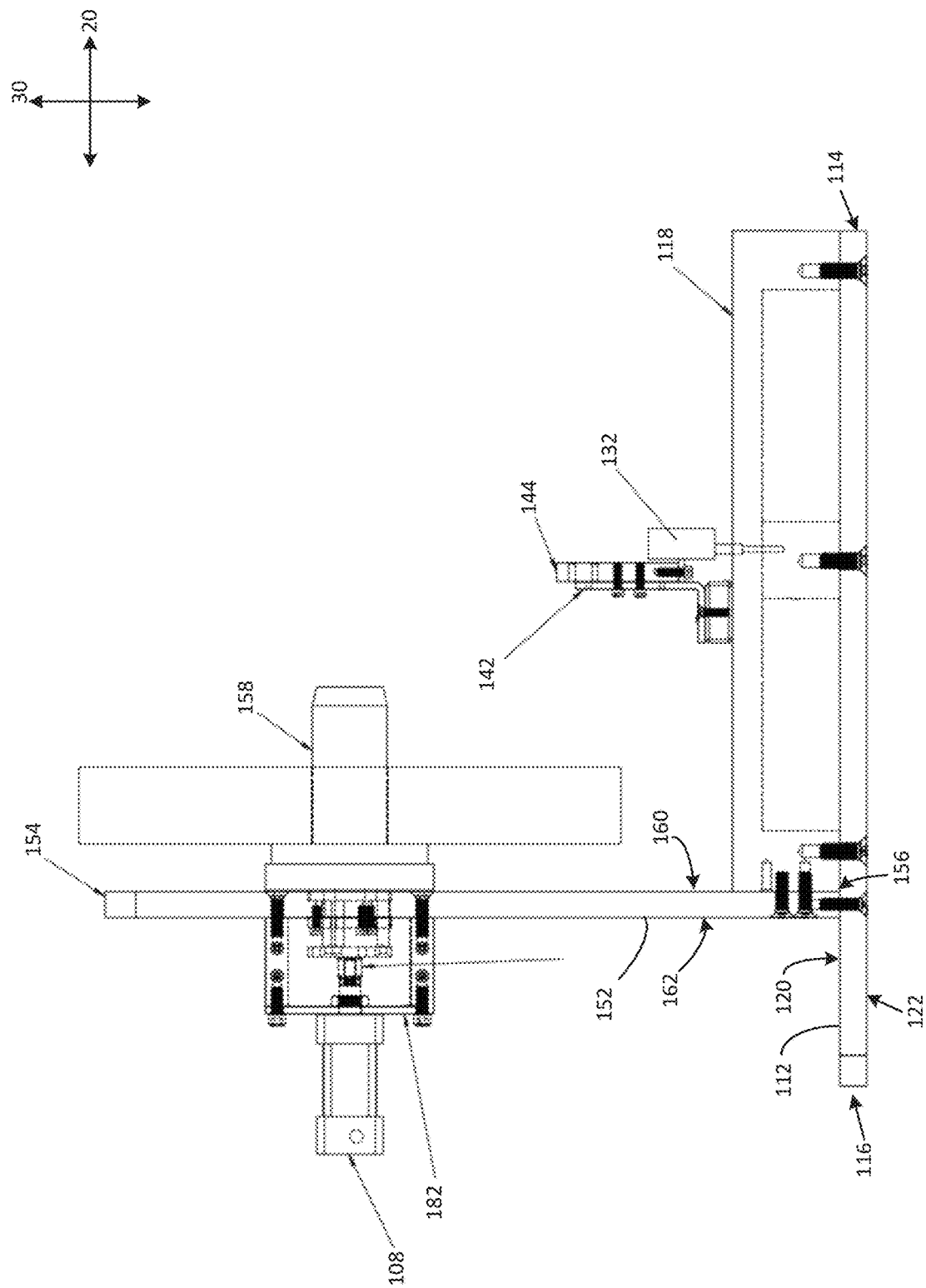
FIG. 4 is a cross-sectional side view of the roll fed material measurement apparatus of FIG. 2.

The vertical plate 152 includes a first plate end 154 and a second plate end 156 disposed longitudinally away from the first plate end 154. In other words, the vertical plate 152 is orientated vertically along the normal direction 30 and lateral direction 10. A first plate surface 160 (e.g., top surface) extends from the first plate end 154 toward the second plate end 156 and is configured to receive the second test material 106. A second plate surface 162 (e.g., bottom surface) is displaced in the normal direction 30 away from, and substantially parallel to, the first plate surface 160. The second plate surface 162 extends from the first plate end 154 toward the second plate end 156. The second plate end 156 is coupled to the first plate surface 120 and is adjacent to the ends of the first support member 108 and the second support member 118 such that the first plate surface 160 abuts the first support member 108 and the second support member 118. As shown in FIG. 1, the vertical plate 152 is positioned between the first plate end 114 and the second plate end 116 of the horizontal plate 112 closer to the second plate end 116. In some embodiments, the vertical plate 152 is positioned approximately one-fourth the total length (e.g., distance from the first plate end 114 and the second plate end 116 of the horizontal plate 112) from the second plate end 116. As shown in FIG. 4, the vertical plate 152 may be affixed to the horizontal plate 112 by a plurality of fastening members (e.g., nut-thread connection, fasteners, etc.).

Figure 2:
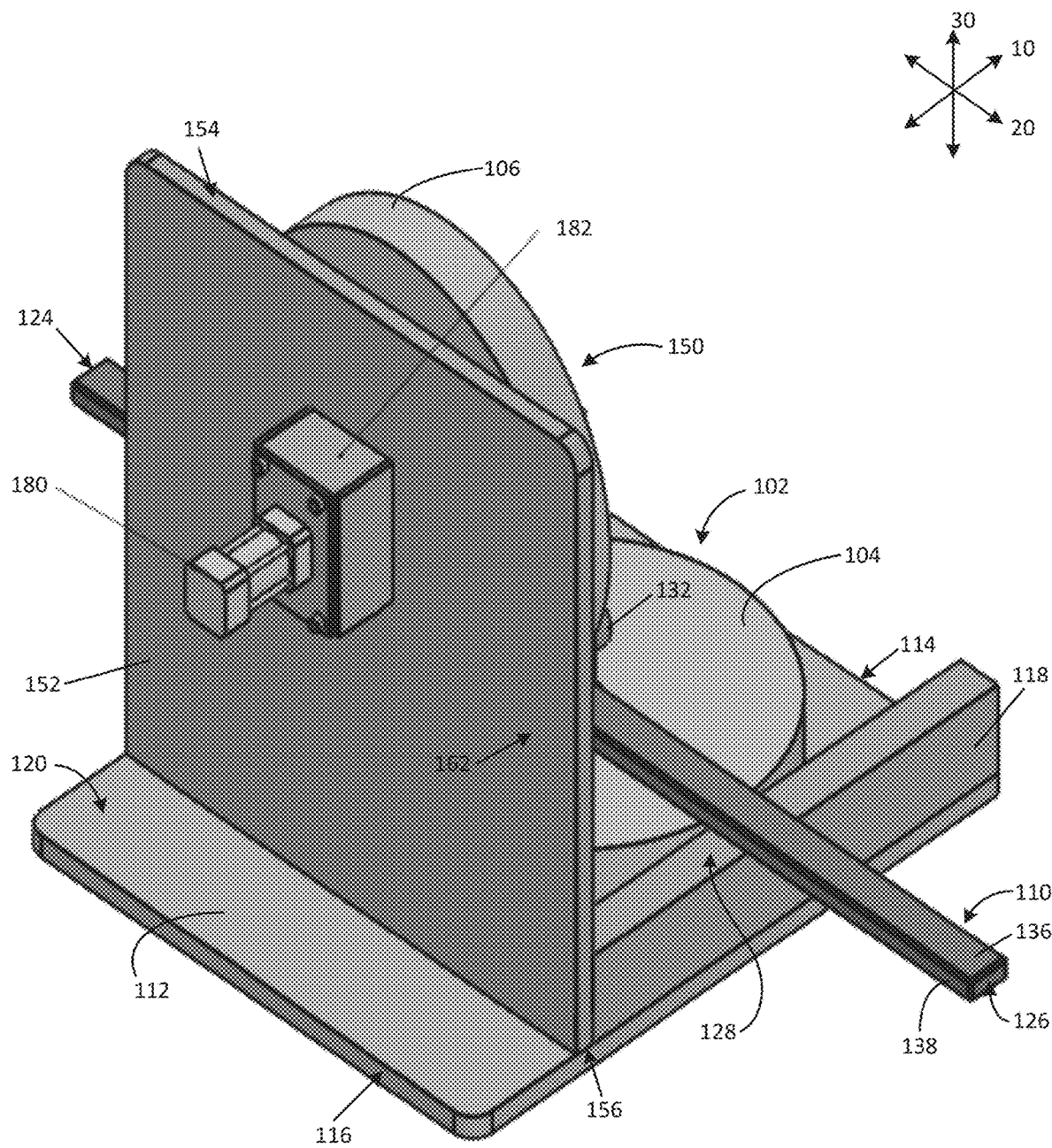
FIG. 2 is a rear perspective view of the roll fed material measurement apparatus of FIG. 1.
Figure 3:
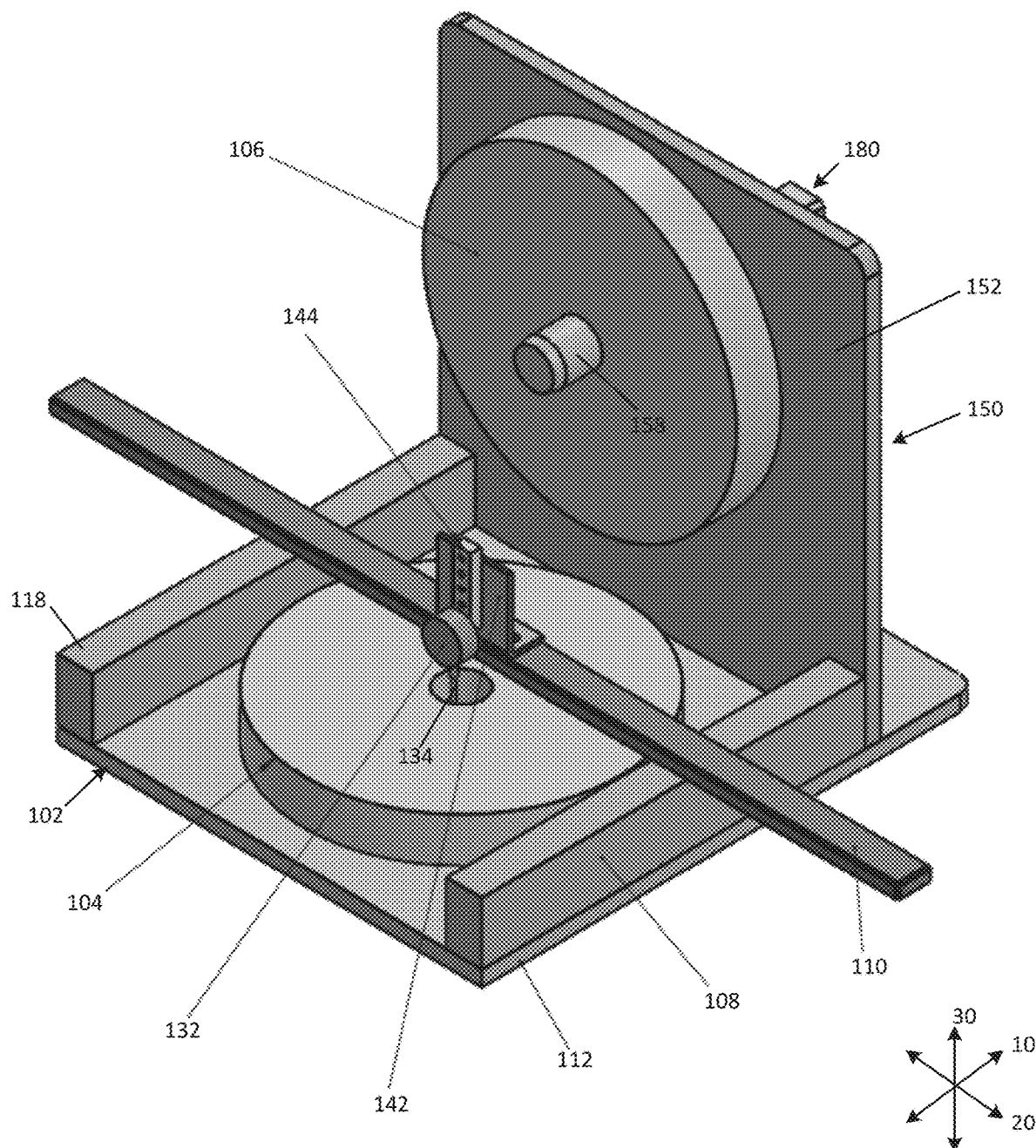
FIG. 3 is a front perspective view of the roll fed material measurement apparatus of FIG. 1 without an indicator on the roundness measurement device, according to an example embodiment.

The cylinder 158 protrudes from the first plate surface 160 in the longitudinal direction 20 away from the second plate surface 162. The cylinder 158 is configured to receive the central opening of the second test material 106. As shown in FIG. 2, the cylinder 158 is affixed to the roll fed material measurement apparatus 100 by a cylinder base 182 positioned on the second plate surface 162. A fluid system 180 is operably connected to the cylinder base 182. The fluid system 180 is configured to provide a fluid to the second measurement portion 150 to cause the second test material 106 on the cylinder 158 to rotate about the axis of the cylinder 158. In some embodiments, the fluid system 180 provides air such that cylinder 158 is an air-actuated spindle. As the fluid system 180 provides fluid to rotate the second test material 106 about the cylinder 158, the second measurement indicator 170 and the third measurement indicator 190 contact the surface and perimeter of the second test material 106, respectively. As shown in FIG. 4, the cylinder base 182 may include one or more components of the fluid system 180.

Turning to FIG. 1, the second measurement indicator 170 is coupled to the first plate surface 160 by a support arm 178 and base 176. The base 176 is coupled to the first plate surface 160 and the support arm 178 extends from the base 176 in the longitudinal direction 20 away from the first plate surface 160 and in the lateral direction 10 over the surface of test surface of the second test material 106. The second indicator 172 includes a sensor 174 that extends substantially in the longitudinal direction 20 to allow for the sensor 174 to contact the test surface of the second test material 106. In some embodiments, the second indicator 172 comprises a dial indicator and the sensor 174 comprises a contact-based wire. In other embodiments, the sensor 174 comprises an infrared, laser, or other light based measurement device. The sensor 174 may be configured to capture, measure, or quantify one or more properties of the test material, including concentricity, flatness, total runout, parallelism, roundness, and other parameters of the test material.

The third measurement indicator 190 is coupled to the first plate surface 160 by a base 196. The base 196 is coupled to the first plate surface 160 to position the third indicator adjacent the perimeter of the second test material 106. The third indicator 192 includes a sensor 194 that extends substantially in the lateral direction 10 to allow for the sensor 194 to contact the test surface of the perimeter of the second test material 106. In some embodiments, the third indicator 192 is a dial indicator and the sensor 194 is a contact-based wire. In other embodiments, the sensor 194 is an infrared, laser, or other light based measurement device. In some embodiments, the base 196 is adjustable or the base 196 includes an adjustable arm to allow the sensor 194 to move in the lateral direction 10 to accommodate test materials with a smaller diameter. The sensor 194 may be configured to capture, measure, or quantify one or more properties of the test material, including concentricity, flatness, total runout, parallelism, roundness, and other parameters of the test material.

In practice, the user places the second test material 106 on the cylinder 158 by inserting the cylinder 158 through a central opening in the second test material 106. In some embodiments, and as shown in FIG. 4, the second test material 106 is adjacent the first plate surface 160 of the vertical plate 152. When the second test material 106 is properly positioned on the cylinder 158, the second measurement indicator 170 is positioned to allow the sensor 174 to contract the top test surface of the second test material 106. Additionally, when the second test material 106 is properly positioned on the cylinder 158, the third measurement indicator 190 is positioned to allow the sensor 194 to contact the perimeter of the test surface of the second test material 106. In some embodiments, a cable with actuator is operably connected to the second measurement indicator 170 and/or the third measurement indicator 190 and is configured to be pressed by the user to capture data. The user actuates the fluid system 180 to provide the fluid to the cylinder 158 and cause the second test material 106 to rotate about the cylinder 158. As the second test material 106 spins the sensor 174 contacts a plurality of points along the test surface of the second test material 106. Data is collected by the sensor 174 as the sensor 174 moves along the test surface of the second test material 106 to quantify the flatness of the test surface of the second test material 106. In some embodiments, the sensor 174 captures a minimum and maximum distance along the test surface of the second test material 106 to determine the variance in the test surface of the second test material 106. In some embodiments, an acceptable variance in the material is 1 mm. Similarly, as the second test material 106 spins the sensor 194 contacts a plurality of points along the perimeter of the second test material 106. Data is collected by the sensor 194 as the sensor 194 moves along the perimeter of the second test material 106 to quantify the roundness of the perimeter of the second test material 106. In some embodiments, the sensor 194 captures a minimum and maximum distance along the perimeter of the second test material 106 to determine the variance in the test surface of the second test material 106 to quantify if the second test material 106 is properly wound around the core and/or if there is any side-to-side movement of the second test material. In some embodiments, an acceptable variance in the material is less than 1 mm.

Figure 5:
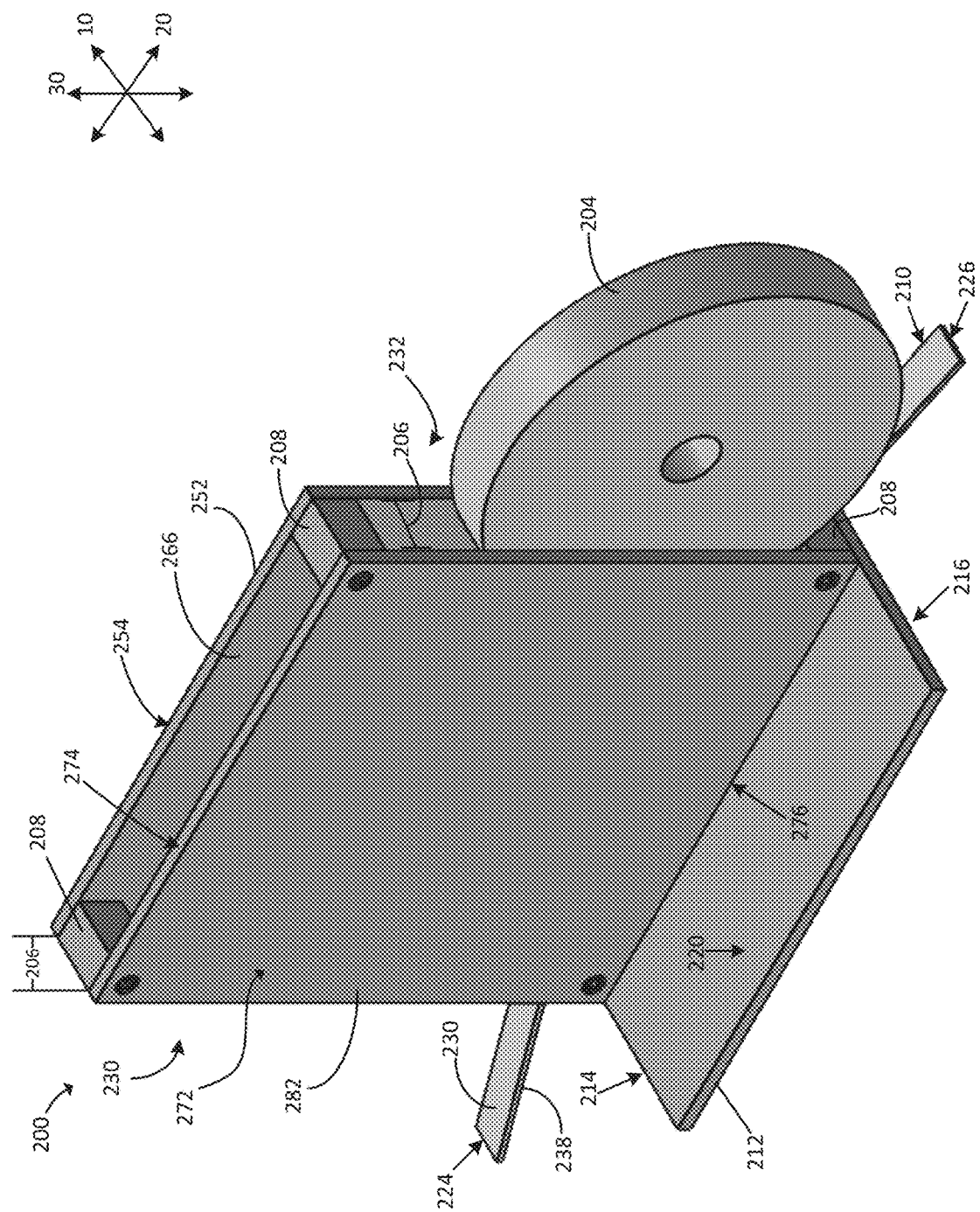
FIG. 5 is a perspective view of a binary (e.g., go-no go) roll fed material measurement apparatus, according to an example embodiment.
Figure 6:
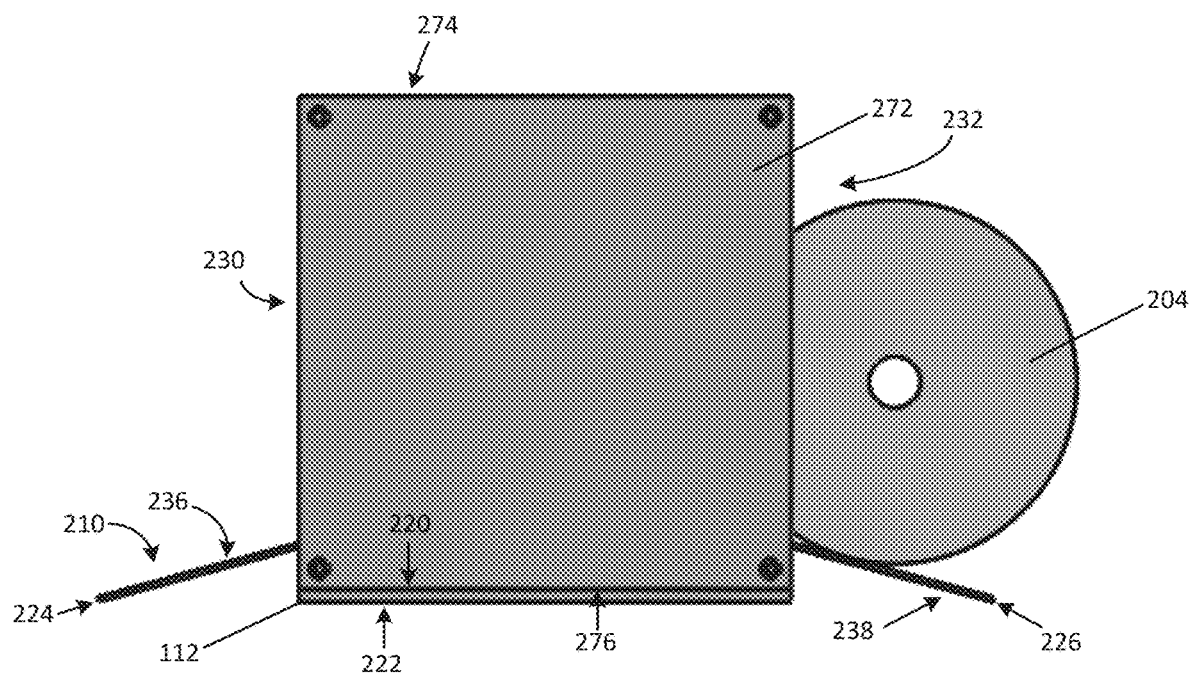
FIG. 6 is a side view of the binary roll fed material measurement apparatus of FIG. 5.
Figure 7:
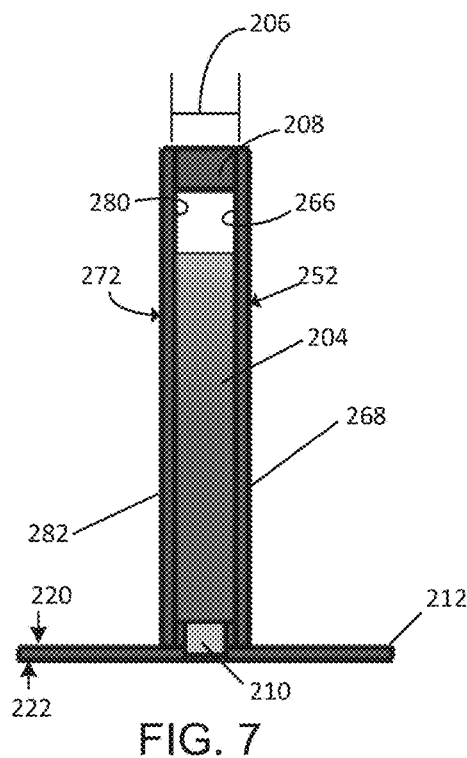
FIG. 7 is a front view of the binary roll fed material measurement apparatus of FIG. 5.

Referring to FIGS. 5-7, a binary roll fed material measurement apparatus 200 with a go, no-go clearance test is shown, according to an example embodiment. The roll fed material measurement apparatus 200 defines a clearance width 206 formed between a first vertical plate 252, a second vertical plate 272, and test track 210 positioned above a horizontal plate 212. Generally, the test material (e.g., third test material 204) is pushed through the clearance width to provide a binary measurement test. In other words, if the third test material 204 passes through the clearance width 206 from the first apparatus end 230 and the second apparatus end 232. In some embodiments, the clearance width is 1 mm. The third test material 204 may be a roll fed material similar to the first test material 104 and the second test material 106. In some embodiments, the third test material 204 is a tipping bobbin. The roll fed material measurement apparatus 200 has a height along a normal direction 30, a width along a lateral direction 10, and a length along a longitudinal direction 20.

The horizontal plate 212 includes a first plate end 214 and a second plate end 216 disposed longitudinally away from the first plate end 114. In other words, the horizontal plate 112 is orientated horizontally along the longitudinal direction 20 and lateral direction 10. A first plate surface 220 (e.g., top surface) extends from the first plate end 114 toward the second plate end 116. A second plate surface 222 (e.g., bottom surface) is displaced in the normal direction 30 away from, and substantially parallel to, the first plate surface 220. The second plate surface 222 extends from the first plate end 214 toward the second plate end 216. In some embodiments, the horizontal plate 112 is a datum plate.

The first vertical plate 252 includes a first plate end 254 and a second plate end 256 disposed longitudinally away from the first plate end 254. In other words, the first vertical plate 252 is orientated vertically along the normal direction 30 and lateral direction 10. A first plate surface 266 (e.g., inner surface) extends from the first plate end 254 toward the second plate end 256 and is configured to be adjacent the third test material 204 as the third test material 204 passes through the roll fed material measurement apparatus 200. A second plate surface 268 (e.g., outer surface) is displaced in the normal direction 30 away from, and substantially parallel to, the first plate surface 266. The second plate surface 268 extends from the first plate end 254 toward the second plate end 256. The second plate end 256 is coupled to the first plate surface 220. In some embodiments, the first vertical plate 252 is a datum plate.

The second vertical plate 272 includes a first plate end 274 and a second plate end 276 disposed longitudinally away from the first plate end 274. In other words, the second vertical plate 272 is orientated vertically along the normal direction 30 and lateral direction 10. A first plate surface 280 (e.g., inner surface) extends from the first plate end 274 toward the second plate end 276 and is configured to be adjacent the third test material 204 as the third test material 204 passes through the roll fed material measurement apparatus 200. A second plate surface 282 (e.g., outer surface) is displaced in the normal direction 30 away from, and substantially parallel to, the first plate surface 280. The second plate surface 282 extends from the first plate end 274 toward the second plate end 276. The second plate end 276 is coupled to the first plate surface 220.

The second vertical plate 272 is disposed away from the first vertical plate 252 in the lateral direction 10. A plurality of support members 208 are positioned between the first vertical plate 252 and the second vertical plate 272. As shown in FIG. 5, each support member in the plurality of support members 208 extends from a corner portion of the first vertical plate 252 in the lateral direction 10 toward a corresponding corner portion of the second vertical plate 272. In some embodiments, the plurality of support members 208 are positioned to provide a clearance height test of the third test material 204. A clearance width 206 is defined by the distance between the first plate surface 266 of the first vertical plate 252 and first plate surface 280 of the second vertical plate 272.

A test track 210 extends between a first track end 224 and second track end 226 that extends past the first apparatus end 230 and the second apparatus end. The test track 210 is positioned between the first vertical plate 252 and the second vertical plate 272. The first track surface 236 is configured to receive a perimeter surface of the third test material 204. The second track surface 238 is configured to rest upon at least one of the plurality of support members 208 and/or the horizontal plate 212.

In practice, the user pushes the third test material 204 through the first apparatus end 230 toward the second apparatus end 232. The third test material 204 travels along the test track 210 between the first vertical plate 252 and the second vertical plate 272. If the third test material 204 contacts the first plate surface 266 and/or the first plate surface 280 such that the third test material 204 is difficult to move through the clearance width, the third test material 204 is not within the acceptable variance for the test material. In some embodiments, an acceptable variance in the material is less than 1 mm.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A measurement apparatus, comprising:
   a horizontal plate, the horizontal plate comprising:
      a first plate end;
      a second plate end disposed away from the first plate end in a longitudinal direction;
      a first plate surface extending between the first plate end and the second plate end; and
      a second plate surface extending between the first plate end and the second plate end, the second plate surface disposed away from the first plate surface in a normal direction, the normal direction perpendicular to the longitudinal direction;
      a first support member extending from the first plate end longitudinally toward the second plate end and the first support member protruding from the first plate surface away from the second plate surface in the normal direction;
      a second support member extending from the first plate end longitudinally toward the second plate end, the second support member protruding from the first plate surface away from the second plate surface in the normal direction, the second support member disposed away from the first support member in a lateral direction, the lateral direction perpendicular to the normal direction and the lateral direction perpendicular to the longitudinal direction;
   a measurement bar contacting the first support member and the second support member; and
   an indicator coupled to the measurement bar, the indicator configured to measure a surface of a test material, the test material positioned on the first plate surface between the first support member and the second support member.

2. The measurement apparatus of claim 1, wherein the indicator further comprises a sensor, the sensor is configured to contact the surface of the test material and capture changes in height in the normal direction along the surface of the test material.

3. The measurement apparatus of claim 2, wherein the sensor comprises a wire having a first wire end and a second wire end, wherein the sensor captures a distance between the first wire end and the second wire end at a plurality of points along the surface of the test material.

4. The measurement apparatus of claim 2, wherein the sensor comprises a wire having a first wire end and a second wire end, wherein the sensor captures a distance between the first wire end and the second wire end along the lateral direction of the surface of the test material.

5. The measurement apparatus of claim 2, further comprising:
   a vertical plate, the vertical plate comprising:
      a third plate end;
      a fourth plate end disposed away from the third plate end in the normal direction;
      a third plate surface extending between the third plate end and the fourth plate end; and
      a fourth plate surface extending between the third plate end and the fourth plate end, the fourth plate surface disposed away from the third plate surface in the longitudinal direction; and
      a cylinder extending from the third plate surface away from the fourth plate surface, the cylinder configured to receive the test material, wherein the cylinder protrudes through a central opening in the test material when the test material is positioned adjacent the third plate surface.

6. The apparatus of claim 5, wherein the indicator is a first indicator and the sensor is a first sensor, further comprising:
   a second indicator coupled to the third plate surface by a support arm, the second indicator comprising a second sensor extending substantially in the longitudinal direction, the second sensor configured to contact the surface of the test material.

7. The apparatus of claim 5, wherein the indicator is a first indicator and the sensor is a first sensor, further comprising:
   a second indicator coupled to the third plate surface, the second indicator comprising a second sensor extending substantially in the lateral direction, the second sensor configured to contact a perimeter of the test material.

8. The measurement apparatus of claim 5, further comprising a cylinder base, the cylinder base positioned on the fourth plate surface, the cylinder base receiving an end of the cylinder; and a fluid system coupled to the cylinder base, the fluid system configured to provide a fluid to rotate the test material about the cylinder.

9. The measurement apparatus of claim 1, wherein the first support member comprises a top first support member surface and wherein the second support member comprises a top second support surface, the top first support member surface coplanar with the top second support member surface, and wherein the measurement bar is configured to move along the top first support member surface and the top second support member surface.

10. The measurement apparatus of claim 1, wherein the measurement bar comprises a first bar end, a second bar end disposed laterally away from the first bar end, a first bar surface extending from the first bar end laterally toward the second bar end, and a second bar surface extending from the first bar end laterally toward the second bar end, the second bar surface disposed normally away from the first bar surface, and wherein the second bar surface contacts the first support member and the second support member, and wherein the indicator is coupled to the first bar surface at a central location between the first bar end and the second bar end.

11. A measurement apparatus comprising:
    a vertical plate, the vertical plate comprising:
       a first plate end;
       a second plate end disposed away from the first plate end in a normal direction;
       a first plate surface extending between the first plate end and the second plate end; and a second plate surface extending between the first plate end and the second plate end, the second plate surface disposed away from the first plate surface in a longitudinal direction, the normal direction perpendicular to the longitudinal direction;
a cylinder extending from the first plate surface away from the second plate surface, the cylinder configured to receive a test material, wherein the cylinder protrudes through a central opening in the test material when the test material is positioned adjacent the first plate surface; and
an indicator coupled to the first plate surface, the indicator comprising a sensor configured to contact a surface of the test material.

12. The measurement apparatus of claim 11, wherein the indicator is a first indicator and the sensor is a first sensor, wherein the first sensor extends substantially in a lateral direction, the first sensor configured to contact a perimeter of the test material, and further comprising a second indicator coupled to the first plate surface by a support arm, the second indicator comprising a second sensor extending substantially in the longitudinal direction, the second sensor configured to contact the surface of the test material.

13. The measurement apparatus of claim 11, wherein the indicator is a first indicator and the sensor is a first sensor, wherein the first indicator is coupled to the first plate surface by a support arm, the first sensor extending substantially in the longitudinal direction, the first sensor configured to contact the surface of the test material, further comprising a second indicator coupled to the first plate surface, the second indicator comprising a second sensor extending substantially in a lateral direction, the second sensor configured to contact a perimeter of the test material, wherein the lateral direction is perpendicular to the normal direction and the lateral direction perpendicular to the longitudinal direction, the second sensor configured to contact a perimeter of the test material.

14. The measurement apparatus of claim 13, further comprising:
a horizontal plate, the horizontal plate comprising:
a third plate end;
a fourth plate end disposed away from the third plate end in the longitudinal direction;
a third plate surface extending between the third plate end and the fourth plate end; and
a fourth plate surface extending between the third plate end and the fourth plate end, the fourth plate surface disposed away from the third plate surface in the normal direction;
a first support member extending from the third plate end longitudinally toward the fourth plate end and the first support member protruding from the third plate surface away from the fourth plate surface in the normal direction;
a second support member extending from the third plate end longitudinally toward the fourth plate end, the second support member protruding from the third plate surface away from the fourth plate surface in the normal direction, the second support member disposed away from the first support member in the lateral direction; and
a measurement bar contacting the first support member and the second support member.

15. The measurement apparatus of claim 14, further comprising:
A third indicator coupled to the measurement bar, the third indicator comprising a third sensor configured to contact the surface of the test material when the test material is positioned on the third plate surface between the first support member and the second support member.

16. The measurement apparatus of claim 15, wherein the third sensor is further configured to detect changes in surface height in the normal direction along the surface of the test material.

17. The measurement apparatus of claim 16, wherein the third sensor further comprises a wire having a first wire end and a second wire end, and wherein the third sensor captures a distance between the first wire end and the second wire end at a plurality of points along the surface of the test material.

18. The measurement apparatus of claim 15, wherein the first support member comprises a top first support member surface and wherein the second support member comprises a top second support surface, the top first support member surface coplanar with the top second support member surface, wherein the measurement bar is configured to move along the top first support member surface and the top second support member surface.

19. The measurement apparatus of claim 15, wherein the measurement bar comprises a first bar end, a second bar end disposed laterally away from the first bar end, a first bar surface extending from the first bar end laterally toward the second bar end, and a second bar surface extending from the first bar end laterally toward the second bar end, the second bar surface disposed normally away from the first bar surface, and wherein the second bar surface contacts the first support member and the second support member, and wherein the third indicator is coupled to the first bar surface at a central location between the first bar end and the second bar end.

20. The measurement apparatus of claim 11, further comprising a cylinder base, the cylinder base positioned on the second plate surface, the cylinder base receiving an end of the cylinder; and a fluid system coupled to the cylinder base, the fluid system configured to provide a fluid to rotate the test material about the cylinder.

* * * * *